United States Patent
Sheikh et al.

(10) Patent No.: US 7,252,230 B1
(45) Date of Patent: Aug. 7, 2007

(54) METHOD AND APPARATUS FOR REAL-TIME TRACKING OF INVENTORY USING ACTIVE RFID TECHNOLOGY

(75) Inventors: Waseem Aman Sheikh, Concord, MA (US); Brian P. Suckow, Palo Alto, CA (US); Dave Evans, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 11/125,489

(22) Filed: May 9, 2005

(51) Int. Cl.
*G06G 7/00* (2006.01)
(52) U.S. Cl. .................. 235/439; 235/384; 235/385
(58) Field of Classification Search ............. 235/484, 235/384, 439, 383, 440
See application file for complete search history.

(56) References Cited

U.S. PATENT DOCUMENTS 5,565,858 A * 10/1996 Guthrie ................. 340/10.33
5,959,568 A * 9/1999 Woolley ................... 342/42
2004/0155778 A1* 8/2004 Shek et al. ............. 340/572.1
2006/0049249 A1* 3/2006 Sullivan ................... 235/385

* cited by examiner

Primary Examiner—Seung Ho Lee
(74) Attorney, Agent, or Firm—Sierra Patent Group, Ltd.

(57) ABSTRACT

Systems and method for dynamically tracking assets located in different geographic zones are disclosed. Disclosed embodiments include a central zone hosting an inventory system. The inventory system is in network communication with remote zones that include sensors for interrogating tagged assets located in the zones. The inventory system is configured to poll the remote zones to obtain information regarding the tagged assets and store the information in a database. The inventory system may then determine whether any of the received information deviates from an expected result, and take appropriate action in response to the deviation.

15 Claims, 5 Drawing Sheets

METHOD AND APPARATUS FOR REAL-TIME TRACKING OF INVENTORY USING ACTIVE RFID TECHNOLOGY

BACKGROUND

1. Field of the Disclosure

The disclosure relates generally to inventory management, and in particular, to managing inventory using active RFID technologies.

2. The Prior Art

Background

Accurately tracking inventory is crucial for manufacturing companies. When companies cannot properly track inventory, improper stock balances may lead to increased financial costs and customer dissatisfaction. One area where inventory management is problematic is when inventories are dispersed over a wide geographical area, and throughout many different segments of a company. For example, field sales personnel may carry finished goods as samples. A further challenge exists when companies store finished goods at a customer's location on a consignment basis, and the inventory is managed by the customer.

A lack of inventory control can lead to many problems, including the over-stocking of raw materials and finished goods to compensate for poor systems as managers attempt to prevent shortages. Sales and service personnel may also engage in self-serving efforts by stockpiling inventory to get around poor inventory systems. Also, unpredictable inventory levels inevitably lead to increased costs resulting from crisis management when inventory must be expedited as managers attempt to get the right inventory to the customer on time.

Accurate tracking of specific pieces of inventory can become critical when the inventory is a high-value item, such as in the medical and instrumentation industries. Hospitals may store items that cost several thousands of dollars on site in case of a medical emergency. When such an item is consumed, either the hospital must inform the vendor, or a local sales representative will note the use when conducting an on-site visit. Furthermore, field-based personnel often carry around high cost items as samples or service replacements. As a result, inventory managers may not have an accurate account of where high-value assets are located, how many are at a particular location or with a particular employee, or when they are consumed by a customer.

Prior art methods for managing inventory typically comprise bar code scanner-based systems where inventory is tracked by scanning a barcode as the inventory moves from one station to the next. However, scanner-based systems have serious shortcomings when inventory moves out of the immediate factory environment. Sales and service personnel, particularly those that work in the field or at a customer's location, may not be properly trained or otherwise motivated to systematically scan inventory in their possession. Therefore, managers responsible for the company's assets may not have an accurate real-time picture of where their inventory is located.

A newer technology being used in inventory management is Radio Frequency Identification (RFID) that comprises a radio tag that is automatically scanned as it passes near a reader. Passive RFID tags can be effective in a managed factory environment where inventory travels along predetermined routes and resides in known locations. However, passive RFID tags have a range of only several feet, making passive RFID tags only as effective as barcodes when the inventory leaves the factory as the RFID tags must be manually scanned.

Furthermore, passive RFID tags typically do not perform accurately in challenging situations, such as in arbitrary architectural environments where metal structures may be present including metal shelving in a store room, or in the garage of an office building or home. Finally, in the systems of the prior art, inventory enclosed in a metal container, such as the samples contained in the trunk of an employee's car, must be accounted for by hand.

DETAILED DESCRIPTION

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

The present disclosure provides a real-time automated inventory tracking and management system that utilizes active RFID technology. The RFID sensors of this disclosure may receive signals from active RFID tags from hundreds of feet away, resulting in the system being able to maintain a persistent connection with assets managed by the system. As a result, the real-time location of an asset may be interrogated and monitored as needed, and the system being updated as often as desired. Active RFID tags can be monitored in challenging environments where prior art passive RFID tags fail, including locations where the RFID tag is substantially enclosed in metal, such when stored on metal racks or in the trunk of a car.

The present disclosure contemplated assets being located at one or more zones. As used in this disclosure, a zone may be defined as a location where tagged inventory is stored and monitored by at least one RFID sensor. As will be more fully disclosed below, the zones are typically located at geographically distant locations from each other, and in communication to a central server through an IP network such as the Internet.

Zones are preferably defined wherever assets may be stored, such as warehouses, consignment locations, points of sale, and field locations. The assets of this disclosure are preferably tagged with active RFID tags that are encoded with information corresponding to the product such as a unique ID code. The system is configured to interrogate assets located in the various zones periodically to determine the state of the inventory. The central system may then match information stored in the inventory system to the inventory's unique ID number, and produce reports based on the gathered information. This tracking and querying may be done automatically without the intervention of personnel, e.g., field personnel, customer personnel, remote personnel, etc. Thus, through the benefits of this disclosure, inventory management may be accomplished with little or no human effort, as tracking is performed automatically.

The system may also be configured to detect events and perform predefined actions responsive to such a detection. For example, the system may be configured to determine when an item has been consumed, moved out of the zone, or otherwise changed state. For example, additional sensors may be provided with the RFID tags to detect environmental conditions such as light, temperature, or motion detection, and trigger event-based alerts or other processes based on a detection made by the secondary sensors.

Event detection coupled with information provided by the RFID tag interrogation may then be used in combination to automatically invoke enterprise systems such as accounting, audit, and billing modules. The disclosed system may also be used to dynamically drive inventory management systems, and to better manage inventory in the field.

Thus, by using secondary systems in combination with active RFID technology, the disclosed system may automatically gather information in a dynamic fashion as needed without human intervention, thereby overcoming the deficiencies of prior art systems.

Various embodiments of an inventory system will now be disclosed.

Figure 1:
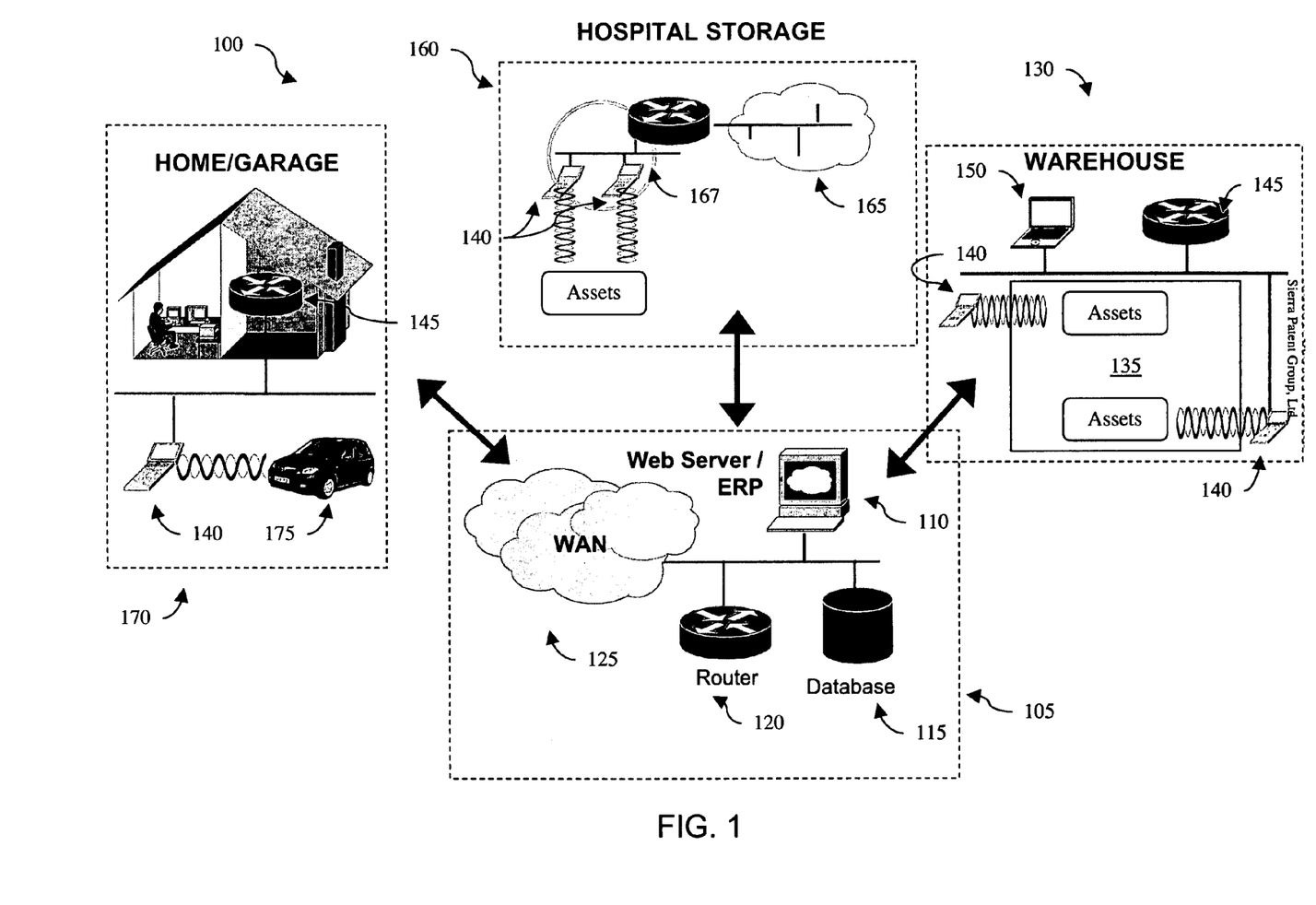
FIG. 1 is a conceptual diagram of a dynamic inventory system configured in accordance with the teachings of this disclosure.

FIG. 1 provides an exemplary illustration of one enterprise solution in accordance with the teachings of this disclosure. In the discussion that follows, the example enterprise comprises a medical equipment provider supplying high value assets to the medical industry. It is to be understood that the teachings of this disclosure may be applied to other industry applications without departing from the scope of this disclosure.

FIG. 1 is a conceptual diagram of a dynamic inventory system 100 configured in accordance with the teachings of this disclosure. FIG. 1 illustrates the various zones where assets may be stored, tracked, and managed in accordance with the teachings of this disclosure.

The system 100 of FIG. 1 includes a central zone 105 that houses the systems for monitoring and managing assets located in the various zones of this disclosure.

It is contemplated that the central zone 105 may typically comprise the medical device manufacturer's central office location that includes pre-existing network connectivity infrastructure. For example, the central zone 105 may include a server 110 for hosting an Enterprise Resources Planning system (ERP) utilized by the host enterprise. The server 110 may also be configured to host a web server for use by the enterprise. The ERP and Web Server may be interfaced with the systems of this disclosure as will be more fully disclosed below.

The server 110 may be coupled to a Wide Area Network (WAN) 125 through a head-end router 120. Various records and the like may be stored on a database 115, which may be accessible to the various elements of this disclosure through the WAN 125 as managed by the head-end router 120.

It is preferred that pre-existing network connectivity will be leveraged including the existing infrastructure of the medical device maker's network. It is contemplated that embodiments of this disclosure may employ the pre-existing infrastructure to provide network connectivity between the various zones and the central site 105. Such a scenario exists when the medical device maker also owns or otherwise controls the various zones and has established network connectivity through their WAN. In cases where the zones are located at corporate partner sites, VPN connectivity may be employed as will be more fully described below.

It is contemplated that sensitive information may be associated with assets monitored in accordance with this disclosure. Accordingly, security may be achieved remotely as the RFID readers will be connected to the central zone's network over the dedicated WAN 125. If any of the remote zones do not have a dedicated WAN connection, security procedures may be followed as will be more fully discussed below.

FIG. 1 includes examples of at least three exemplary zones where assets may be tracked. FIG. 1 illustrates a warehouse zone 130, a hospital storage zone 160, and a home or garage storage zone 170. It is to be understood that other zones may be defined without departing from the scope of this disclosure.

It is contemplated that Internet connectivity is available from the various zones through a leased line like a T1, or a broadband connection like DSL or Cable, and the like. To ensure security, it is contemplated that a VPN connection may be used to connect the central zone with the remote sites. To accomplish this, it is contemplated that each remote zone may include a router 145 such as a Cisco 813 router at the remote side, which will act as the VPN endpoint at the remote zone. In a preferred embodiment, a single router is provided for a zone, which may have multiple storage areas. The head end router 120 may comprise a Cisco 3700 or 7200 series router. The router 120 will act as the VPN endpoint for the central zone, controlling data and management of the VPN connection. Routers from other vendors having similar functionality may be employed as well.

It is contemplated that the operation of the system 100 may be based on a poll model at the central zone where the central site application will periodically poll the remote interrogators to gather information regarding the assets. In preferred embodiments, the head end VPN router 120 may be configured to initiate a VPN tunnel to corresponding remote-side VPN routers to establish a VPN tunnel for the poll period.

To securely poll remote sites, data stored in the tag may be encrypted in accordance with applicable RFID standards. The VPN connection may be encrypted with standard encryption algorithms like 3DES or AES supported with VPN solutions available from the assignee of this disclosure. The head end router 120 and the remote routers 145 will authenticate each other before a VPN tunnel is established. This may be accomplished via PKI (Public Key Infrastructure) in coordination with a Secure ACS (Access Control Server) available from the assignee of this disclosure. This will ensure data integrity and authenticity of information passed over the VPN tunnel.

Turning first to the hospital storage zone 160, it is contemplated that high value assets such as medical devices are stored for use in operations and procedures performed in the hospital. Thus, assets are placed in the hospital zone on a consignment basis, and the hospital is billed when the assets are consumed.

To keep track of the assets, one or more RFID sensors/interrogators 140 are dispersed about the zone 160. Active RFID tags may be affixed to the packaging of the assets along with additional sensors as will be more fully disclosed below.

It is contemplated that network connectivity with the RFID sensors 140 may be accomplished through one of several alternatives depending on the network infrastructure to the hospital zone's LAN 155.

In a first alternative, the RFID sensors may be made to be part of the LAN 155. To preserve security and satisfy privacy requirements, strong access control measures access between the two networks should be established.

A second option for providing enhanced security provides the RFID sensors are located on a network that is isolated from the Hospital LAN. In such as scenario, the RFID sensors may be numbered with the hospital zone's own IP address space. The router 145 can be placed in a DMZ network to keep the setup secure. As will be appreciated, separate physical cabling must be provided for connecting the RFID sensors deployed in various storage closets and consignment areas about the zone. It will be appreciated that wireless networks may be employed in the present disclosure as well.

A third alternative that provides enhanced security without the need for additional physical cabling involves employing VLANS (Virtual LANs). In this scenario, the RFID sensor's ports may be assigned to a VLAN 167 that connects only to the VPN formed by the endpoint router 145, and is kept isolated from the hospital zone's LAN 165.

FIG. 1 also includes a warehouse zone 130 where assets may be stored. It is contemplated that one or more RFID sensors 140 may be deployed about a desired warehouse space 135 containing assets to be tracked. The sensors 140 may be coupled to a router 145 that may be configured as disclosed above regarding the hospital zone 160. If the warehouse in zone 130 is operated through a corporate partner, then the sensors 140 may be isolated using the DMZ or VLAN techniques disclosed above to isolate the sensors from the corporate network.

FIG. 1 also includes a home/garage zone 170 where assets may be stored. Such a zone may be defined at the residence of sales or service staff that have the need to keep high value assets on hand for sales or service purposes.

It is contemplated that one or more RFID sensors 140 may be deployed about the residence, and in particular, within range of an automobile 175 that may contain assets to be tracked in a trunk. The sensors 140 may be coupled to a router 145 that may be configured as disclosed above regarding the hospital zone 160. As mentioned above, if it is desired to isolate the RFID sensors from a LAN present in the home, the DMZ or VLAN techniques disclosed above may be employed to provide isolation.

The home zone 170 illustrates a particularly challenging situation when the asset is substantially enclosed in metal and other materials when in the trunk of the car 175. It is contemplated that active tags having sufficient output may be employed that allow signals to emanate through cracks and crevices present in the body of the car. Thus, tracking information may be polled and sent to the central zone without intervention of the resident when the car is within range of the reader.

It is contemplated that a wireless LAN may be provided for situations where physical connectivity from inside the home to the garage is not available. The RFID reader 140 may be connected to a wireless bridge as is known in the art from which connectivity to the inside of the home can be established.

To provide a secure connection to the home zone 170, the router 145 in the home may employ a VPN as the connectivity mechanism from the central zone to the end user home. The home router is preferably configured to terminate broadband connectivity from the home's service provider and at the same time comprise the end point for a VPN tunnel.

As will be appreciated, field personnel may cover large geographic regions, sometimes traveling hundreds and thousands of miles. Likewise, it may be desired to track inventory being shipped in truck.

To facilitate remote tracking, it is contemplated that an active RFID reader may be deployed in the vehicle, and operate in wireless communication to the central zone. For example, the vehicle may be equipped to read information from the tag and communicate with the central zone over a cellular data network. In such a case, the RFID reader may be equipped with a GPRS, CDMA 2000 or WCDMA antenna to transfer information through a conventional cellular modem.

Alternatively, the vehicle may be equipped with a mobile router, such a Cisco Mobile Access Router (MAR) 3200 available from the assignee of this disclosure. When so equipped, the vehicle now has access to the Cellular Data Network through GRPS or CDMA.

As the mobile router is full functioning router, the vehicle now has secure Internet access, in addition to RFID tag sensing and tracking capabilities. The router may also be equipped with an 802.11 antenna to talk to a Wireless LAN. Thus, when the vehicle is within the coverage area of a hotspot, the mobile router can connect through the wireless LAN and then securely connect to the central network through the VPN techniques described above.

It will be appreciated that the MAR may be deployed in a manner most convenient for tracking an asset being moved. For example, the MAR may be installed in the packaging of the asset to facilitate tracking wherever the asset is moved until the asset is removed from the packaging. MARs may also be installed throughout the logistical chain of the asset, i.e., delivery vehicles, trains, airplanes, and along expected paths of travel to track assets as accurately as desired.

It is contemplated that assets tracked with MAR may occasionally be transported out of range of a wireless connection. Memory associated with the MAR and RFID tag may be used to store sensed events and report the events to the central unit when the MAR is brought back within range of a wireless network.

Figure 2:
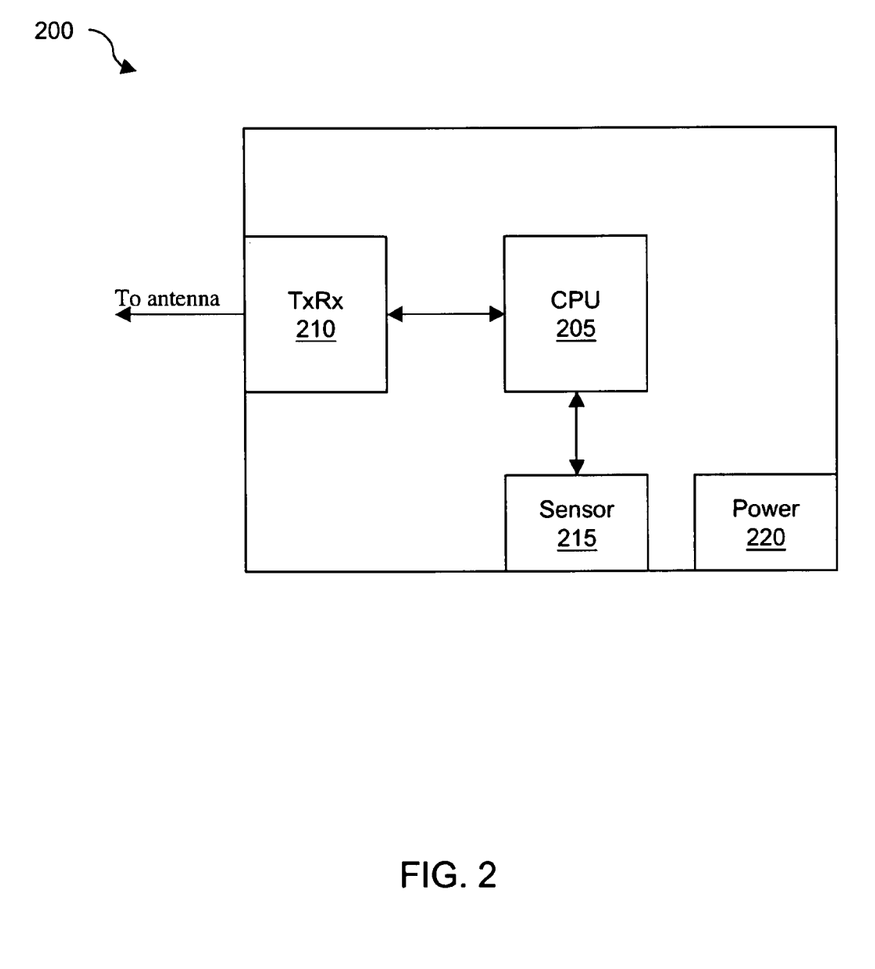
FIG. 2 is a conceptual block diagram of an active RFID tag configured in accordance with this disclosure.

Turning now to FIG. 2, a conceptual block diagram of an active RFID tag 200 configured in accordance with this disclosure is shown. The tag 200 includes a central microprocessor unit (CPU) 205 for controlling the overall operation of the tag, and may include a processor and associated memory for carrying out embodiments of this disclosure. The CPU is preferably interfaced with a transceiver 210 for sending and receiving signals to and from an RFID reader. Power may be provided to the various components of the tag by a power supply 220, typically a battery.

The active RFID tags of this disclosure may be compliant with one or more competing standards, such as those proposed by ISO/IEC 18000-n, or EPCglobal. European standards are currently being proposed by the ETSI.

In a preferred embodiment, the following fields may be used in the tags of this disclosure (with exemplary field lengths):

Model, (17 characters);
Serial number, (12);
Use by date, (mm/dd/yyyy);
Book price, (15);
Days in location, (4);
Location ID, use same codes as currently in ERP, (20).

The active RFID tags of this disclosure may also be of the read/write form, allowing data to be stored therein for later retrieval when being interrogated by a reader. To increase the capability of the tag, one or more onboard sensors 215 may be provided to sense and store a wide variety of information in addition to that normally stored on an RFID tag. For example, integration with temperature, humidity, or motion/shock sensors may be employed to document an asset's environmental exposure history. It is contemplated that such additional data may be gathered to more accurately detail events related to a particular asset (i.e., environmental exposure history, when moved, etc.).

It is contemplated that additional fields corresponding to onboard sensors may be provided. For example, fields corresponding to measured temperature, humidity, and force readings may be stored on the tag, and the measurements provided to the system when polled. In a preferred embodiment, tags and readers from WhereNet, Inc., may be employed.

Various modes of operation of the system of this disclosure will now be disclosed.

Figure 3:
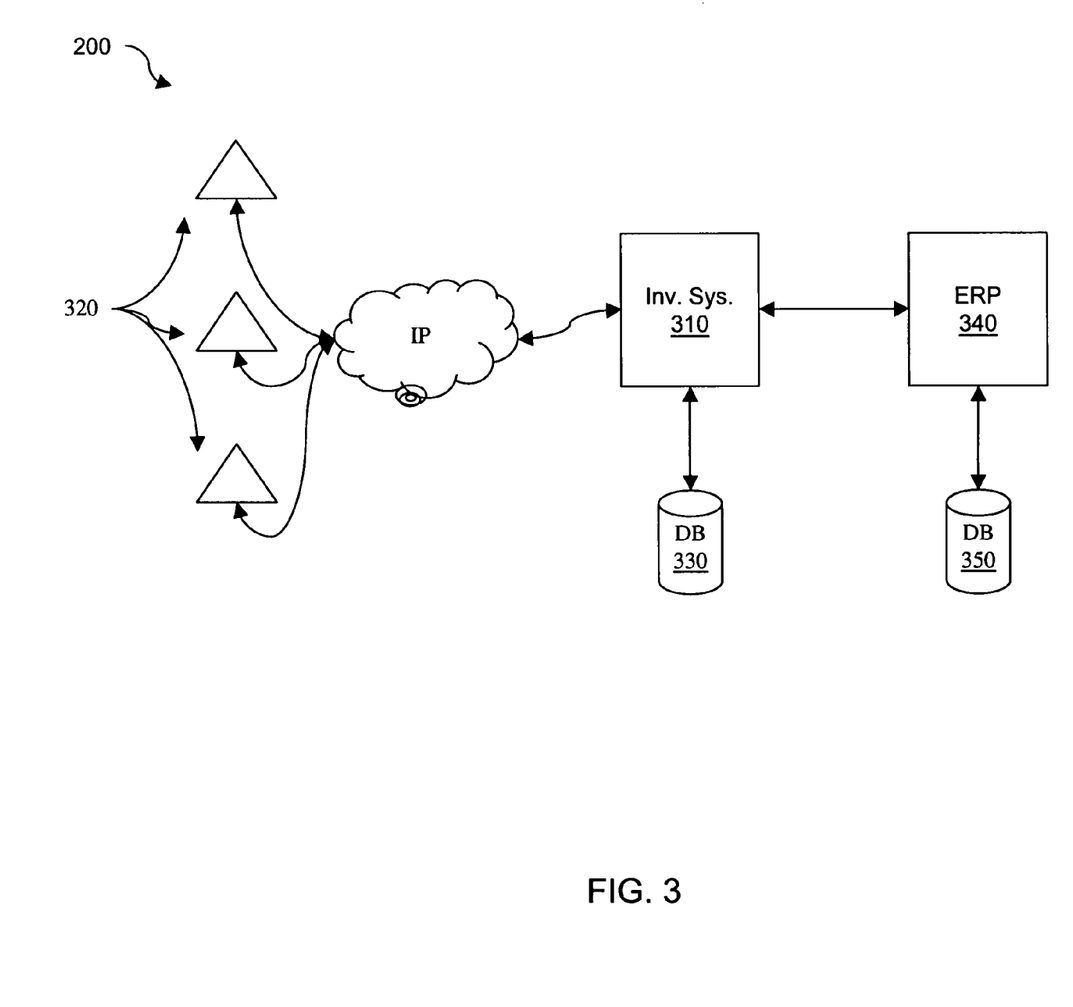
FIG. 3 is a conceptual diagram of a dynamic inventory system configured in accordance with the teachings of this disclosure.

Referring now to FIG. 3, it is contemplated that the central zone may maintain an inventory management system 310 configured to poll the various remote readers 320, and store and retrieve gathered information in a database 330. As mentioned above, typically the host enterprise will maintain an ERP 340 having an associated database 350.

The inventory system database 330 may contain records indexed by a unique identifier associated with a particular asset, such as serial number. The database 330 may then associate and store the information contained in the asset's tag in the database 330.

It is further contemplated that the ERP 340 and the inventory system 310 may be configured to communicate data stored in respective databases between the two systems. The inventory system 310 may reside on the same physical computer as the ERP 340, or on a separate physical machine as desired.

Figure 4:
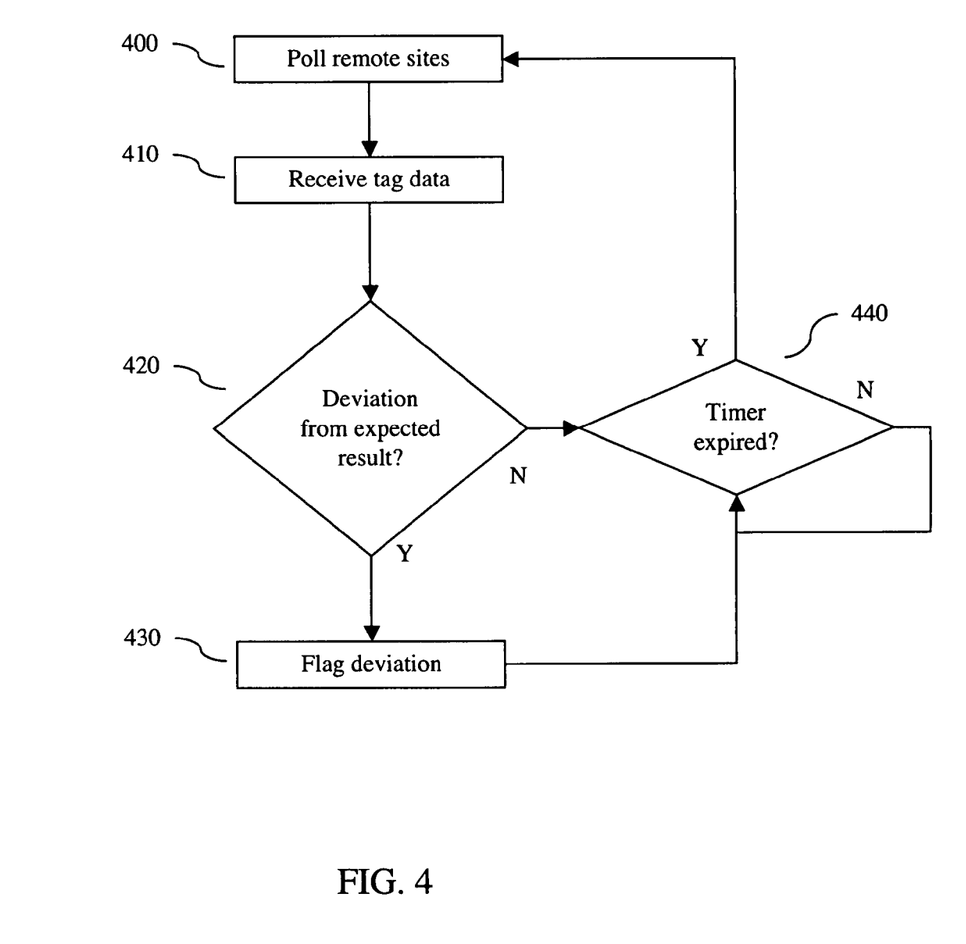
FIG. 4 is a flowchart of dynamically creating an inventory of assets stored in geographically separate zones in accordance with this disclosure.

FIG. 4 is a flowchart of dynamically creating an inventory of assets stored in geographically separate zones in accordance with this disclosure. The process begins in act 400 where the central zone polls the readers deployed in the various remote zones. As mentioned above, the central zone may initiate security procedures prior to the initiation of polling, such as forming secure VPN tunnels through which data may be transported over the Internet. In act 410, the data from each of the zones is received over the network from each of the reporting zones. The received data is then stored in the database and sorted as needed, i.e., by product interrogated at a particular location.

In query 420, the process may then determine whether a discrepancy exists at a particular location. For example, as shown in FIG. 3, the inventory management system of this disclosure may be configured to interface with the host's ERP system. In doing so, the system may receive expected levels of assets to be found at particular locations. If a sensed parameter deviates from an expected level, the system may flag an alert to the ERP to facilitate further investigation in act 430.

A timer may be used in query 440 to initiate the process as often as necessary to poll at desired intervals. Additionally, it is contemplated that different zones may be polled at different intervals, i.e., the home zone may be polled after hours when the car is expected to be in range of a reader, while other zones may be polled more frequently.

It is contemplated that additional fields may be included in the database for providing the event-based features of this disclosure. For example, the readings of additional sensors on the RFID tags may be gathered and stored when polled by the system. The inventory system may then be configured to determine whether an event has been triggered for the particular asset. For example, if a polling reveals a lower number of assets than a previous polling at a particular zone, an asset may have been consumed. Consequently, the central zone may wish to notify the appropriate personnel at the location to investigate.

Figure 5:
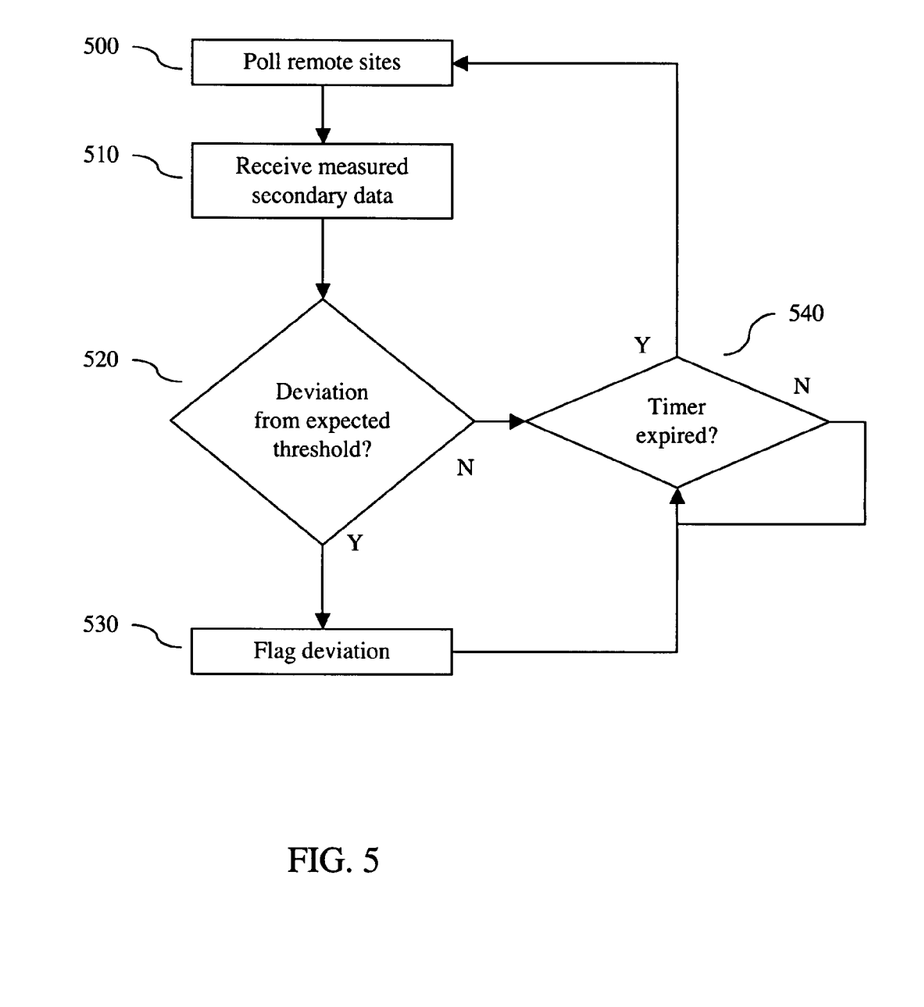
FIG. 5 is a flow chart of a method for determining whether an asset has been subjected to an event in accordance with this disclosure.

FIG. 5 is a flow chart of a method for determining whether an asset has been subjected to an event.

The process begins in act 500 where the central zone polls the readers deployed in the various remote zones. As mentioned above, the central zone may initiate security procedures prior to the initiation of polling, such as forming secure VPN tunnels through which data may be transported over the Internet. The central zone also instructs the RFID tag to retrieve any sensor readings present on the tag. In act 510, the data from each of the zones is received over the network from each of the reporting zones. The received data is then stored in the database with the additional sensor data measured at each location associated with each product and location.

In query 520, the process may then determine whether an event has occurred that warrants attention. The system is preferably configured to have thresholds associated with particular measurement criteria and locations. These thresholds may include ranges of acceptable temperatures, humidity, or other environmental factors. The system may also be configured to sense whether an asset has been subjected to a force exceeding a predetermined level, i.e., whether the asset has been dropped.

The host ERP may provide these additional thresholds to the inventory system for comparison. If a sensed parameter deviates from an expected threshold, the system may flag an alert to the ERP to facilitate further investigation in act 530.

A timer may be used in query 540 to initiate the process as often as necessary to poll at desired intervals.

It is to be understood that the disclosed system may include different thresholds for the same parameter when measured at different locations. For example, a tighter temperature threshold may be desired at a warehouse or hospital zone than for assets used in the field.

Additionally, both processes of FIGS. 4 and 5 may be employed simultaneously to manage event information gathered by each process.

The following discussion illustrates the benefits of the disclosed system in operation as applied to the medical products provider example discussed above. The following exemplary scenario follows tracked assets throughout the supply chain to illustrate the dynamic and instantaneous advantages of the disclosed system. The process begins in the warehouse zone after an asset is tagged for tracking.

In the warehouse zone, an RFID tag may be affixed to the outside of the asset's product packaging or product as appropriate. When tagged assets are moved into range of a reader deployed in the warehouse zone or the tag is otherwise placed in a transmit mode, the tagged assets may then be entered into the inventory system when polled. At this point, the tagged asset is now placed in inventory along with the assets currently being tracked.

Eventually, tagged products will be packed and shipped in response to an order from a field sales representative (or other customer). After shipping, the tagged asset will leave the shipping dock and will not be sensed in the next polling. The system will then detect that an asset has been removed from the warehouse's inventory. If the polling interval is set to poll at a small interval (i.e., several seconds), the database shows the receipt at and shipment from the warehouse of tagged assets as these occur in real-time.

Later, the field sales representative who ordered the product receives the package containing the tagged asset at his/her house. The sales rep takes the package into his/her garage, opens the trunk of a car, and places the package inside the trunk. The RFID reader mounted in the garage and defining the house zone will scan the entire trunk inventory at the next polling, including the recently added package. The appearance of the additional inventory will now be dynamically updated in the central zone's database.

The database now shows the current total inventory in the sales rep's trunk, and the system may flag any discrepancy versus expected levels.

The sales rep may make a call to the hospital to present the product. At the hospital, the sale rep may remove some products from the trunk, and place these products in a hospital consignment area. The consignment area at the hospital includes an RFID reader that defines the hospital zone.

During the day, an operation is planned utilizing tagged assets. In preparation for the operation, a nurse removes two tagged products (a primary product and a backup) from the hospital consignment closet and brings them to the operating room. The RFID reader for the hospital zone will record two products leaving the area. The nurse later returns the backup product that was not used in operation, accidentally dropping the product on the way to the consignment area. At the next polling, the product's return is updated, and the fact that the product was subjected to a potential fall is indicated.

At the end of the call, the sale rep may remove some tagged assets for return to the factory or for use at another hospital, and place these assets in his/her trunk. At the next polling, the newly-arrived assets are updated in the central zone's database as having arrived at the hospital zone, and the assets removed are updated as well.

At end of day, the sales rep returns home, and the RFID reader will scan the current inventory of trunk stock and the central zone database will be updated accordingly.

As will now be appreciated from the foregoing description, the central database is updated in real-time each time inventory level changes are scanned. Thus, the database dynamically reflects the total sum of inventory at all locations without the need for manual intervention from personnel, such as scanning of barcodes. Scanned levels may be compared against expected levels to detect discrepancies and take appropriate action. Environmental conditions may be scanned to observe what a particular tagged asset has been subjected.

It is contemplated that the greatly increased visibility of assets provided by the system of this disclosure may provide many benefits. For example, inventory accuracy may be increased across the supply chain from warehouse to the point of sale. Thus, with a single scan of tagged inventory, an enterprise will instantly know where all tagged inventory resides, enabling the enterprise to standardize on one global set of processes, data, and systems for managing inventory.

Proactive systems may be put in place to quickly replenish stock levels, reducing the need for overstocking of products throughout the supply chain. Thus, inventory levels can be reduced significantly while providing the same (or improved) service levels for delivery. Costs for supply chain management, logistics, transportation, and expediting shipments can also be reduced significantly. Inventory levels and customer orders may now be forecasted using real-time data that is updated dynamically, and slow moving or obsolete inventory may be identified and aggressively reduced.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A system for dynamically tracking assets located in a plurality of disparate geographic zones comprising:
   a central zone comprising an inventory system;
   at least one remote zone in network communication with the inventory system;
   each of the at least one remote zone including at least one reader for interrogating tagged assets located within range of the at least one reader;
   each of said tagged assets comprising its own active Radio Frequency Identification (RFID) tag having at least one additional onboard sensor for measuring environmental conditions; and
   the inventory system being configured to:
      automatically poll the at least one remote zone to obtain information regarding tagged assets located in the at least one remote zone;
      automatically store the information in a database; and
      automatically determine whether any of the received information deviates from an expected result.

2. The system of claim 1, wherein said inventory system is further configured to determine whether measured environmental conditions deviate from a predefined threshold.

3. The system of claim 1, wherein at least one of said remote zones comprises a zone for scanning tagged assets enclosed in the trunk of a vehicle.

4. The system of claim 3, wherein said vehicle further comprises a sensor for interrogating tagged assets contained in the vehicle, and mobile communication equipment for communication the results of the interrogation to the inventory system.

5. The system of claim 1, wherein said inventory system is further configured to establish a secure means of communication to said at least one remote zone prior to polling said at least one remote zone.

6. An apparatus for dynamically tracking assets located in a plurality of disparate geographic zones comprising:
a central zone comprising inventory system means;
at least one remote zone means in network communication with the inventory system means;
each of the at least one remote zone including at least one reader means for interrogating tagged assets located within range of the at least one sensor;
each of said tagged assets comprising its own active Radio Frequency Identification (RFID) tag having at least one additional onboard sensor for measuring environmental conditions; and
the inventory system means comprising:
means for automatically polling the at least one remote zone means to obtain information regarding tagged assets located in the at least one remote zone;
means for automatically storing the information in a database; and
means for automatically determining whether any of the received information deviates from an expected result.

7. The apparatus of claim 6, wherein said inventory system means further comprises means for determining whether measured environmental conditions deviate from a predefined threshold.

8. The apparatus of claim 6, wherein at least one of said remote zones comprises a residential zone including means for scanning tagged assets enclosed in the trunk of a vehicle.

9. The apparatus of claim 8, wherein said vehicle further comprises sensor means for interrogating tagged assets contained in the vehicle, and mobile communication equipment means for communication the results of the interrogation to the inventory system means.

10. The apparatus of claim 6, wherein said inventory system is further comprises means for establishing a secure means of communication to said at least one remote zone prior to polling said at least one remote zone.

11. A method for dynamically tracking assets located in a plurality of disparate geographic zones comprising:
providing a central zone inventory system and at least one remote zone in network communication with the inventory system;
providing at least one reader in each of the at least one remote zones for interrogating tagged assets located within range of the at least one reader, wherein each of said tagged assets comprises its own active Radio Frequency Identification (RFID) tag having at least one additional onboard sensor for measuring environmental conditions;
automatically polling, by said inventory system, the at least one remote zone to obtain information regarding tagged assets located in the at least one remote zone;
automatically storing the information in a database; and
automatically determining whether any of the received information deviates from an expected result.

12. The method of claim 11, further comprising the act of determining whether measured environmental conditions deviate from a predefined threshold.

13. The method of claim 11, wherein at least one of said remote zones comprises a zone for scanning tagged assets enclosed in the trunk of a vehicle.

14. The method of claim 13, wherein said vehicle further comprises a sensor for interrogating tagged assets contained in the vehicle, and mobile communication equipment for communication the results of the interrogation to the inventory system.

15. The method of claim 11, further comprising the act of establishing a secure means of communication to said at least one remote zone prior to polling said at least one remote zone.

* * * * *